US007610582B2

(12) United States Patent
Becker et al.

(10) Patent No.: US 7,610,582 B2
(45) Date of Patent: Oct. 27, 2009

(54) MANAGING A COMPUTER SYSTEM WITH BLADES

(75) Inventors: Wolfgang Becker, Ludwigshafen (DE); Axel Von Bergen, Wiesloch (DE); Volker Sauermann, Dossenheim (DE); Arne Schwarz, Walldorf (DE); Guenter Zachmann, Rauenberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 10/553,607

(22) PCT Filed: Mar. 25, 2004

(86) PCT No.: PCT/EP2004/050366

§ 371 (c)(1),
(2), (4) Date: Nov. 3, 2006

(87) PCT Pub. No.: WO2004/092951

PCT Pub. Date: Oct. 28, 2004

(65) Prior Publication Data

US 2007/0083861 A1    Apr. 12, 2007

(30) Foreign Application Priority Data

Jun. 16, 2003   (EP)   ................... 03013621

(51) Int. Cl.
*G06F 9/44* (2006.01)
(52) U.S. Cl. ............... 717/171; 717/170; 717/172; 717/176; 717/177
(58) Field of Classification Search .......... 717/168–178
See application file for complete search history.

(56) References Cited

U.S. PATENT DOCUMENTS

| 4,823,256 A | 4/1989 | Bishop et al. |
| 5,551,047 A | 8/1996 | Mori et al. |
| 5,974,566 A | 10/1999 | Ault et al. |
| 6,101,327 A | 8/2000 | Holte-Rost et al. |
| 6,195,616 B1 | 2/2001 | Reed et al. |
| 6,202,207 B1 | 3/2001 | Donohue |
| 6,263,387 B1 | 7/2001 | Chrabaszcz |

(Continued)

FOREIGN PATENT DOCUMENTS

EP    1 037 133    9/2000

(Continued)

OTHER PUBLICATIONS

"Data Migration," from http://en.wikipedia.org/wiki/Data_Migration as available on Dec. 13, 2004.

(Continued)

*Primary Examiner*—Wei Y Zhen
*Assistant Examiner*—Matthew J Brophy
(74) *Attorney, Agent, or Firm*—Finnegan, Henderson, Farabow, Garrett & Dunner, L.L.P.

(57) ABSTRACT

Managing a computer system having a plurality of blades by detecting the presence of a new blade in the computer system; installing an operating system on the new blade; configuring the operation system; and copying a service that is running on an earlier detected blade to the new blade. Further features are testing services and operating system on the new blade and cyclically shifting services through the blades.

23 Claims, 14 Drawing Sheets

U.S. PATENT DOCUMENTS

| | | |
|---|---|---|
| 6,345,266 B1 | 2/2002 | Ganguly et al. |
| 6,453,426 B1* | 9/2002 | Gamache et al. ............... 714/4 |
| 6,625,750 B1 | 9/2003 | Duso et al. |
| 6,728,747 B1 | 4/2004 | Jenkins et al. |
| 6,985,937 B1 | 1/2006 | Keshav et al. |
| 7,315,903 B1* | 1/2008 | Bowden ..................... 709/250 |
| 2002/0095487 A1 | 7/2002 | Day et al. |
| 2002/0133537 A1* | 9/2002 | Lau et al. ................... 709/203 |
| 2003/0046394 A1* | 3/2003 | Goddard et al. ............. 709/226 |
| 2003/0101304 A1 | 5/2003 | King et al. |
| 2003/0105904 A1 | 6/2003 | Abbondanzio et al. |
| 2003/0140267 A1* | 7/2003 | Abbondanzio et al. ......... 714/4 |
| 2003/0154236 A1 | 8/2003 | Dar et al. |
| 2004/0015581 A1* | 1/2004 | Forbes ....................... 709/224 |
| 2004/0024831 A1 | 2/2004 | Yang et al. |
| 2004/0047286 A1 | 3/2004 | Larsen et al. |
| 2004/0054712 A1 | 3/2004 | Andreev et al. |
| 2004/0078621 A1 | 4/2004 | Talaugon et al. |
| 2004/0088414 A1 | 5/2004 | Flynn et al. |
| 2004/0128442 A1 | 7/2004 | Hinshaw et al. |
| 2004/0153697 A1 | 8/2004 | Chang et al. |
| 2004/0210887 A1 | 10/2004 | Von Bergen et al. |
| 2004/0210888 A1 | 10/2004 | Von Bergen et al. |
| 2004/0210898 A1 | 10/2004 | Von Bergen et al. |
| 2004/0255191 A1* | 12/2004 | Fox et al. ..................... 714/25 |
| 2005/0033806 A1 | 2/2005 | Harvey et al. |
| 2005/0246436 A1 | 11/2005 | Day et al. |

FOREIGN PATENT DOCUMENTS

| | | |
|---|---|---|
| WO | WO 94/09585 | 4/1994 |
| WO | WO 02/061612 A2 | 8/2002 |
| WO | WO 02/061613 A3 | 8/2002 |
| WO | WO 03/005192 * | 1/2003 |

OTHER PUBLICATIONS

Constantine P. Sapuntzakis et al., "Migration: Optimizing the migration of virtual computers," Dec. 2002, ACM SIGOPS Operating Systems and Review, vol. 36, Issue SI—retrieved Dec. 21, 2006.

Dejan et al., "Process Migration," Sep. 2000, ACM Computing Survey (CSUR), vol. 32, Issue 3, p. 241-299.

M. Richmond et al., "A New Process Migration Algorithm," XP-002273000, pp. 31-42.

* cited by examiner

MANAGING A COMPUTER SYSTEM WITH BLADES

CROSS REFERENCE TO RELATED APPLICATIONS

This application is a national phase application based on PCT/EP2004/050366, filed Mar. 25, 2004, the content of which is incorporated herein by reference, and claims the priority of U.S. patent application Ser. No. 10/418,305, filed Apr. 18, 2003; U.S. patent application Ser. No. 10/418,308, filed Apr. 18, 2003; U.S. patent application Ser. No. 10/418,307, filed Apr. 18, 2003; and European Patent Application No. 03013621.2, filed Jun. 16, 2003, the content of all of which is incorporated herein by reference.

TECHNICAL FIELD

The present invention generally relates to a computer system, and more particularly relates to methods for managing a computer system with a plurality of computers (blades), in that blades are added or removed while operating an application.

BACKGROUND ART

Business applications (e.g., customer relationship management systems, product lifecycle management systems, or supply chain management systems) may be used to facilitate the management and implementation of complex business processes. As the volume of data and computational complexity of business applications increase, faster, more capable business application servers may be used to meet performance requirements.

One technique that is used to improve system performance is to upgrade to a business application server having greater processing power, increased data throughput, more memory, and additional data storage space. For example, the performance of a typical business application may be improved by purchasing a new server having faster processors, and greater main memory.

Another technique that is sometimes used to increase the performance of a system is to breakdown the complexity of the system into components that may be distributed. For example, web server architectures were largely monolithic in nature with a single server used to support many different tasks and, perhaps, many different websites. As the performance demands of websites increased and as web hosting market grew, the industry trend tended towards breaking the functionality of a website into smaller components that may be run on smaller, less-capable, cheaper servers.

The market met the demand for smaller, inexpensive servers by offering rack-mounted systems complete with one or more processors, main memory, and a hard drive. These rack-mounted systems allow a web-hosting company to provide independent systems to their customers in a configuration that minimizes the needed floor space in the hosting company's facilities.

Rack-mounted servers may substantially increase the number of systems that may be stored in a single rack; however, each system typically is completely independent of the other systems. One technique that has recently been used to further increase the number of systems that may be stored in a single rack is to share some resources, such as power supplies, between multiple systems. For example, a unit, called a blade server, may include one or more power supplies, one or more network interfaces, and slots for one or more small servers built on cards that may be plugged into the blade server.

DISCLOSURE OF THE INVENTION

The invention is summarized as a method for managing a computer system, the system operating with a plurality of blades. The method comprises detecting the presence of a new blade in the computer system; installing (e.g., booting) an operating system on the new blade; configuring the operating system; and copying a service that is running on an earlier detected blade to the new blade. The term "blade" stands for blades physically introduced into the system (e.g., by mechanically inserting a blade into the chassis) and also for blades that are logically introduced into the system (e.g., by allocating an IP-address or otherwise activating the blade). Advantageously, installing the operating system is performed by accessing a mass storage (e.g., so-called "filer") that is part of the system.

Advantageously, installing is performed by using scripts.

Advantageously, installing is performed by using scripts that are part of the service that is, running on the system prior to detecting the new blade. Using scripts that are adapted to the service is advantageous. The service-specialized script provides information for an installation that addresses the needs of the service to be performed on the new blade.

Advantageously, between the detecting and installing steps, the following is performed: monitoring system performance and continuing with installing upon reaching a predefined threshold of a measurement value. In the context of the present invention, reaching the threshold comprises detecting error situations, bottlenecks, software failure, and hardware failure. This approach has the advantage that a reserve blade is plugged in and stands by.

Advantageously, the measurement values are taken from at least one of the following: usage of processor resources, processing times, usage of memory, remaining capacity of data storage, communication parameters of blade interface.

Advantageously, monitoring is performed periodically.

Advantageously, monitoring is performed by monitoring processes (watchdog) that operate consecutively for adjacent blades. "Adjacent" blades are typically physical neighbors that logically belong together.

Advantageously, monitoring is performed by a token ring technique.

Advantageously, the measurement values are related to the blades independently.

Advantageously, when the computer system operates an application for telephone call centre activity (e.g., part of customer relations software), the processing times are related to the call rate and processing times for incoming telephone calls.

Advantageously, computer instructions for performing the detection steps are part of services that are running on the computer system.

Advantageously, computer instructions for performing the detecting and copying steps are performed according to criteria in the service that is running on the earlier detected blade.

Advantageously, copying the service comprises copying data that is accessed from the main memory of the earlier detected blade to the main memory of the new blade.

Advantageously, copying the service comprises restarting the service, wherein the service's executable instructions are loaded from central storage, and wherein an image of the service's process context is transferred to the new blade.

Advantageously, copying the service comprises modifying the version of the service. Advantageously, installing the operating system comprises modifying the system. It is an advantage that the latest versions of services and operating systems are used when copying the services or installing the operating systems. In the context of a business application, the application gradually moves to updated software (both OS and services). Errors can be detected (cf. testing feature). From the view-point of the operator of the system (e.g., the organization that runs the business), the application is constantly renewing without the need of interrupting the application for upgrade purposes. The risk of failure (for the complete application or for its services) is reduced.

Advantageously, in one embodiment where the method is performed for at least 3 blades, the method further comprises the subsequent execution of a controller service, an engine service, and a monitor service, the services belonging to the same business application. This relates also to cyclically shifting the services.

Advantageously, the method is controlled by a controller residing on at least one blade, wherein the controller performs further functions selected from the group of: testing the copy of the service on the new blade and modifying the execution of the service on the earlier detected blade if the copy of the service operates successfully.

Advantageously, modifying comprises stopping the service on the earlier detected blade. It is an advantage to stop the service only if testing is successful.

The present invention has the further aspect of a method for managing a computer system, the system operating with a plurality of computers, the method comprising: assigning a service to set of computers to a group; shifting a service that runs on a first computer of the group to run on a second computer in the group; and reinstalling the operating system to the first computer.

Advantageously, shifting and re-installing is repeated cyclically for all computers in the groups, thereby keeping the number of computers that are re-installing the operating system smaller than the number of computers that are not re-installing the operating systems. For example, in the repetition in a group of first and second computers, the service is shifted back to the first computer and the system is re-installed on the second computer.

Advantageously, shifting is accompanied by testing the service in parallel operation on the first computer and on the second computer and disabling the operation of the service by the first computer only if the test is successful.

Advantageously, in one embodiment, services of a first class (e.g., controller services) are assigned to a first group of computers and services of a second class (e.g., monitoring services) are assigned to a second group of computers. Using specialized computers for specialized service classes is convenient. The services in the service classes usually have similar requirements in terms of software environment (operating system configuration). When re-installing the operating system, the specialized configuration can be taken over. In an exemplary application, there is a first group of computers for the first class of services "engine service" (e.g., search engine with cache), for the second class of services "monitor service" (e.g., watchdog to supervise engines), for the third class of services "controller" (e.g., services that organized data exchange between services. In other words, there is a first cycle (e.g., ring of computers) for the first class, a second cycle for the second class and a third cycle for the third class. It is also possible to circulate the services independent from its class. There could be a super-cycle for circulating the services of all classes.

Advantageously, the method is applied for computers that are blades. By cyclically operating the computers, in average each computer undergoes re-installing. This solves the technical problem of potential software failure in case of progression of internal state, memory leak or the like.

The invention applies also to its embodiment as computer program comprising program instructions for causing a computer to perform the method. The program may be embodied on a record medium.

BEST MODE FOR CARRYING OUT THE INVENTION

Figure 1:
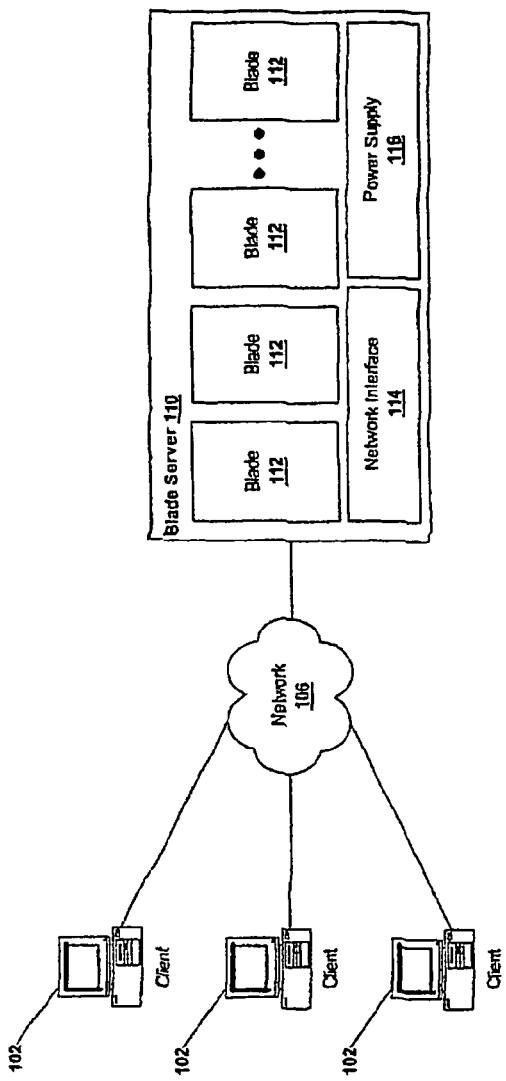
FIG. 1 is a network diagram of a system using a blade server to provide a service to one or more clients.

The present invention may be practiced on a computer system with a plurality of computers. A general description of such a system appears at the end of the specification. The invention is advantageous for use in a computer system comprised of computers located on single-printed circuit boards. The technology of such systems is known, for example, under the term "blade server technology" or "rack-mounted technology".

Distributing processes (services) across multiple blades increases performance and availability of the application. The invention provides an approach to manage this distribution. The following glossary is used to describe the invention.

Each software application usually has a plurality of services. A service is, for example, a database node, an application component, a J2EE engine, an Internet portal etc. Within an application and across applications, a first service (e.g., A) may have the function of a client to a second service (e.g., B); or the first service may have the function of a server to the second service.

Particular services are assigned to particular computers or vice versa. For example, service A could be assigned to computers 1 and 2; service B could be assigned for execution in two instances on computer 3; and service C could be assigned to computer 3.

Assignments can be distinguished into static and dynamic assignments. In case of static assignment, executing particular services is limited to particular computers, as in the figure. In case of dynamic assignment, executing particular services may be shifted from computer to computers The services are available in files with instructions that are ready to be executed by the computer's processors. Such files are also referred to as "binary files". Often, such files have file names with extensions like "exe" or the like. In the above example, the file for service A could be A.exe; the file for service B could be B.exe; the file for service C could be C.exe.

In the process "Installing", the files are written into memory so that the processors of the computers have access to the files. The memory can be temporary memory (e.g., RAM) or permanent memory (e.g., ROM, disk drive) or any combination thereof. Memory and processor communicate according to their physical location, for example, via bus or via computer network.

Configuring stands for adapting the installed service to the particulars of the environment. Often, configuring comprises to change software, for example, by adding or removing files. This is especially challenging in case of dynamic assignments: moving services is often accompanied by moving environments. Executing stands for performing the functions of the service by the computer.

Rack-mounted servers and blade servers provide cost-effective hardware architectures in a configuration that maximizes computer room floor space utilization. These servers typically are used to support independent applications, such as, for example, web servers, email servers, or databases. Large business applications typically have performance requirements that exceed the capabilities of small, rack-mounted servers. It is desirable to provide techniques that may be used to distribute services, such as a business applications across multiple rack-mounted servers and/or multiple server blades.

Referring to FIG. 1, one or more clients 102 connect across a network 106 to a blade server 110 that hosts one or more server applications. The client 102 may include any device operable to access a server across a network, such as, for example, a personal computer, a laptop computer, a personal digital assistant (PDA), a mobile phone, or any similar device. The client 102 includes a network interface to access network 106 that provides a communications link to the blade server 110. Network 106 may use any network technology such as, for example, a local area network, a wireless network, a wide area network, and/or the Internet. The blade server 110 includes multiple slots to receive one or more computer systems, called blades 112.

The blade server 110 also provides a network interface 114 and power supply 116 for use by the blades 112. To increase system availability, some implementations provide redundancy to reduce the likelihood of system outage due to component failure. For example, a blade server 110 may include multiple network interfaces 114 such that when one network interface 114 fails, the system can fall-over to a backup network interface 114. Similarly, the blade server 110 may include two or more power supplies to prevent system outage due to failure of one power supply.

In a high-availability implementation employing two or more network interfaces 114, network load may be spread across the network interfaces 114 while each is active, thus improving network bandwidth and possibly improving overall system performance.

Blade server 110 may be implemented using commercially available products such as, for example, a Dell PowerEdge 1655MC. These products provide the hardware platform and provide some software management support to install operating systems and applications on individual blades 112.

Figure 2:
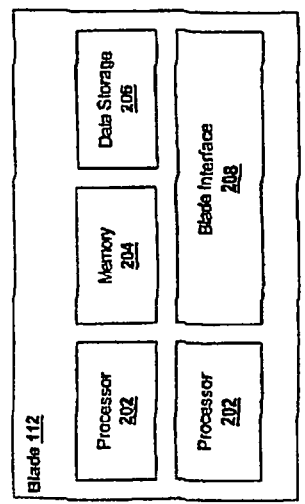
FIG. 2 is a block diagram of a blade that may be used in the blade server shown in FIG. 1.

Referring to FIG. 2, a blade 112 typically includes a computer system on a card that may be plugged into the blade server 110. The blade 112 includes one or more processors 202, memory 204, data storage 206, and a blade interface 208. The blade processors 202 may be implemented using any convention central processing units such as, for example, those made by Intel or AMD. In one implementation, a blade server 110 includes 6 blades 112 and each blade 112 includes 2 Pentium III processors 202, 1 GB of memory 204, and a 100 GB hard drive for data storage 206. Many different blade interfaces 208 to couple the blade 112 with the blade server 110 including high-speed bus interfaces or networking technology (e.g., 1 gigabit Ethernet).

Each blade 112 in a blade server 110 may be used to provide a separate, independent computing environment in a compact footprint. In such an implementation, several services may be provided on a blade server 110 with each service running on a separate blade 112. This prevents a failure on one blade 112 from affecting an application providing a service on another blade 112.

In a monolithic server implementation, many services are provided by a large single server, with each service sharing the resources of the server to satisfy requests from clients. When each service is small and independent, it is typically easy to separate each service and port them to a blade server 110 architecture by distributing services across multiple blades 112, such as, for example, by running each service on a separate blade 112. This implementation may provide increased availability and performance.

Figure 3:
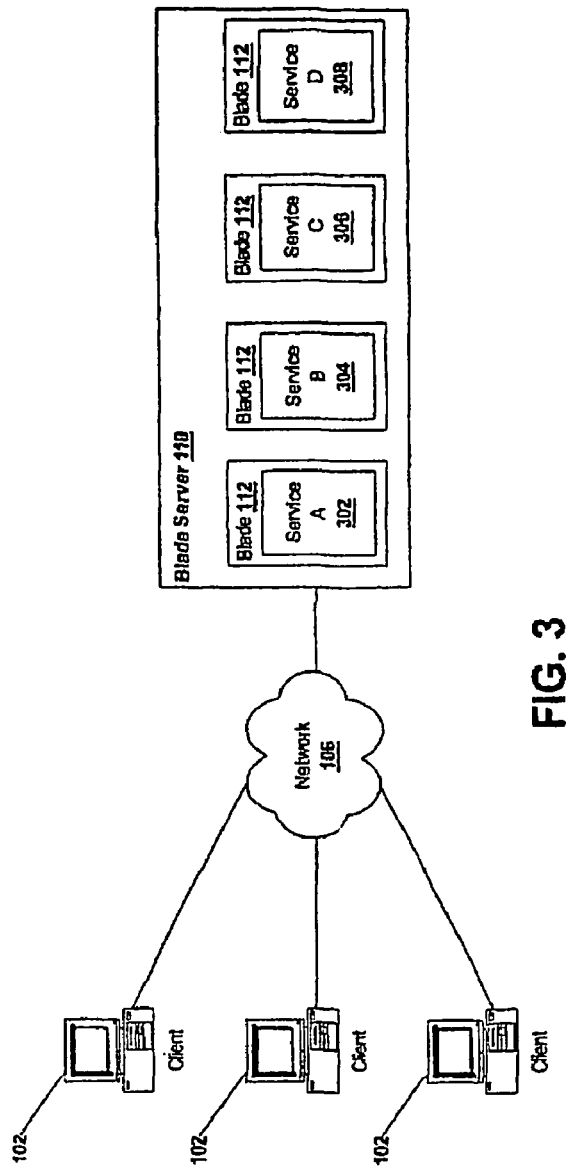
FIG. 3 is a network diagram of a blade server with multiple services distributed across the blades.

Referring to FIG. 3, one or more services may be distributed across multiple blades. In this example, clients 102 send requests across a network to a blade server 110. The requests are routed to the appropriate blade 112 for the requested service. For example, a first blade 112 provides service A 302, another blade 112 provides service B 304, a third provides service C 306, and a fourth blade 112 provides service D 308. The services 302, 304, 306, and 308 may include any computer application, such as, for example, electronic mail, web services, a database, or firewall. In this example, the services 302, 304, 306, and 308 are each remaining on a separate blade 112. In some implementations, it may be desirable to run multiple services on a single blade 112.

The example described above with respect to FIG. 3 shows the use of blade server 110 providing different services that may have once been provided in a single monolithic architecture. The blade server 110 also may be used to support identical types of services that operate independently on individual blades 112. A web-hosting company may use a blade server 110 with each blade 112 providing web services for different customers. Each blade 112 is providing the same service; however, they are serving different data to possibly different clients 102.

Figure 4:
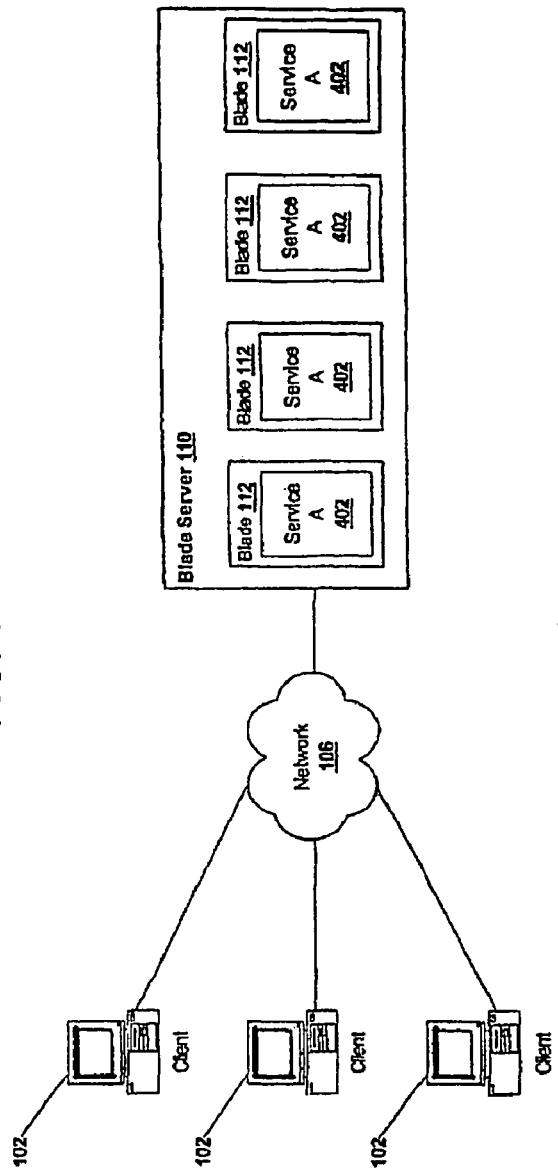
FIG. 4 is a network diagram of a blade server with a service distributed across multiple blades.

Referring to FIG. 4, most applications employing blade server technology choose blade servers to take advantage of their rack density and their effectiveness in providing large numbers of manageable servers. Software management techniques for blade servers assist administrators in installing operating systems and software, and in configuring blades for a new application or new customer. The benefits of blade servers also may be used to distribute a service across multiple blades 112 as described herein below. FIG. 4 shows clients 102 coupled to a network 106 to send requests to the blade server 110. The blade server 110 includes multiple blades 112 running service A 402. This allows a single service to be distributed across multiple blades 112, utilizing resources from multiple blades 112 to satisfy client 102 requests.

For example, when an application is very resource-intensive, it may not be easy to directly port the application to a blade server 110 architecture because the application requires more resources than a single blade can provide. In such a case, it may be desirable to separate out a single service to multiple blades 112 as shown in FIG. 4.

Figure 5:
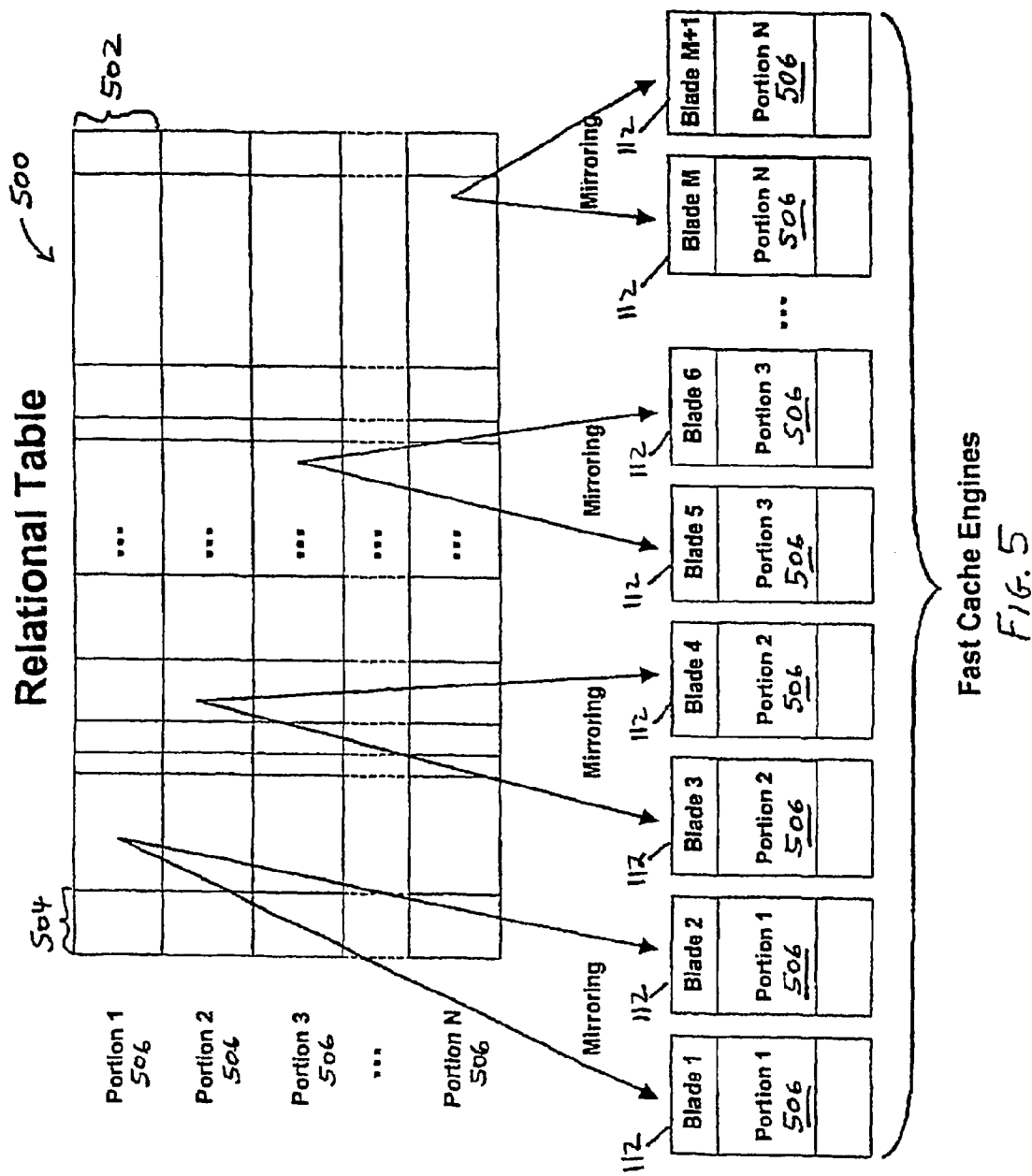
FIG. 5 is a diagram of a table from a relational database management system having data records divided into portions for distribution across multiple blades.

Referring to FIG. 5, some applications may realize increased performance by distributing the application across multiple blades. For example, a fast cache system may require large amounts of memory, data storage, and computational resources.

In some implementations, the fast cache system receives a table 500 from a relational database management system (RDBMS). The table 500 is loaded into the cache and structured to speed the execution of data queries. The fast cache system may require significant resources, perhaps even more than provided by a single blade 112. To improve performance, the fast cache system may be distributed across multiple blades 112 as discussed above with respect to FIG. 4 by dividing the RDBMS table 500, having rows 502 of data records and columns 504 of data attributes, into multiple portions 506 and loading each portion 506 into an instance of the fast cache system running on a blade 112. This is referred to as a horizontal distribution.

In addition to dividing the table 500 into portions 506 and distributing the portions 506 across multiple blades 112, the fast cache system also may mirror portions 506 to increase system availability. For example, FIG. 5 shows the first portion 506 mirrored to two separate blades 112. The separate instances of blades 112 containing the same data portions 506 provide redundancy in case of component failure. In addition, mirrored blades 112 may be used to distribute load across both blades 112 to increase system performance.

For example, if a fast cache system needs to load 50 million data records from a RDBMS table, the table may be broken into 5 portions 506 of 10 million data records each. Each portion 506 is loaded into a separate blade 112 such that when a query is received by the fast cache system, the query is applied to each of the portions 506 loaded into the 5 blades 112. The results from each blade 112 are then combined and returned to the requesting client 102 as will be described below with respect to FIG. 9. By dividing the table 500 into multiple portions 506, the fast cache system may be distributed across multiple blades 112. This technique may provide increased scalability and increased performance.

Figure 6:
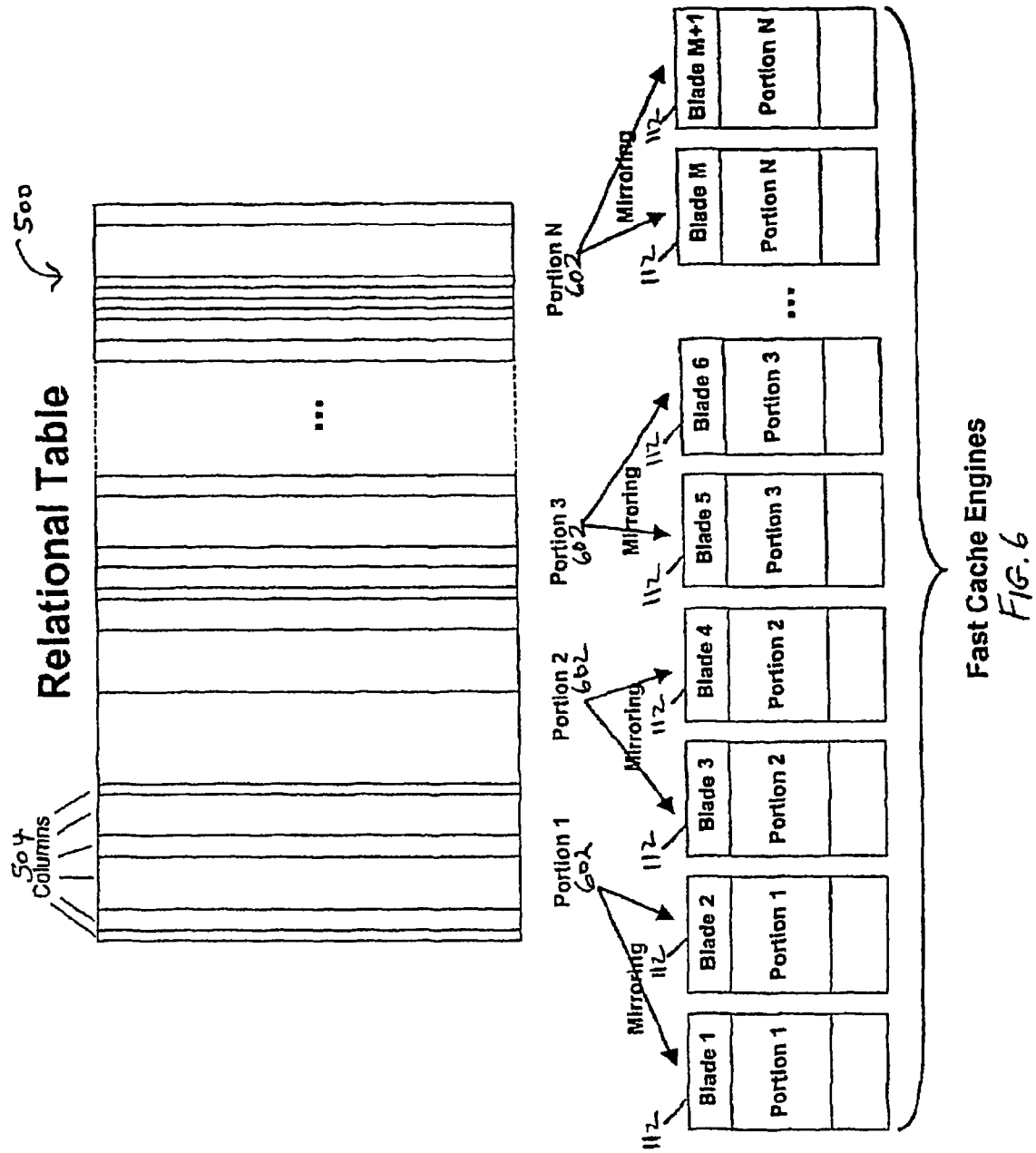
FIG. 6 is a diagram of a table from a relational database management system having data attributes divided into portions for distribution across multiple blades.

Referring to FIG. 6, the table 500 may be divided using a horizontal distribution as discussed above, or it may be divided into portions 602 including columns 504 of data attributes in a vertical distribution. For example, each data record may include the following data attributes: (1) first name; (2) last name; (3) birth date; and (4) customer number. The table 500 may be divided into portions 602 having one or more columns 504 of data attributes. In this example, the portions 602 may include any combinations of columns 504, such as, a first portion 602 with the first name and last name attributes, a second portion 602 with the birth date attribute, and a third portion 602 with the customer number attribute. The table 500 could similarly be divided into any other combinations of data attributes. In these implementations, queries may be sent to each instance of the fast cache system running on multiple blades 112 or may be sent to only the blades 112 including portions 602 of the table 500 relevant to the search.

Figure 7:
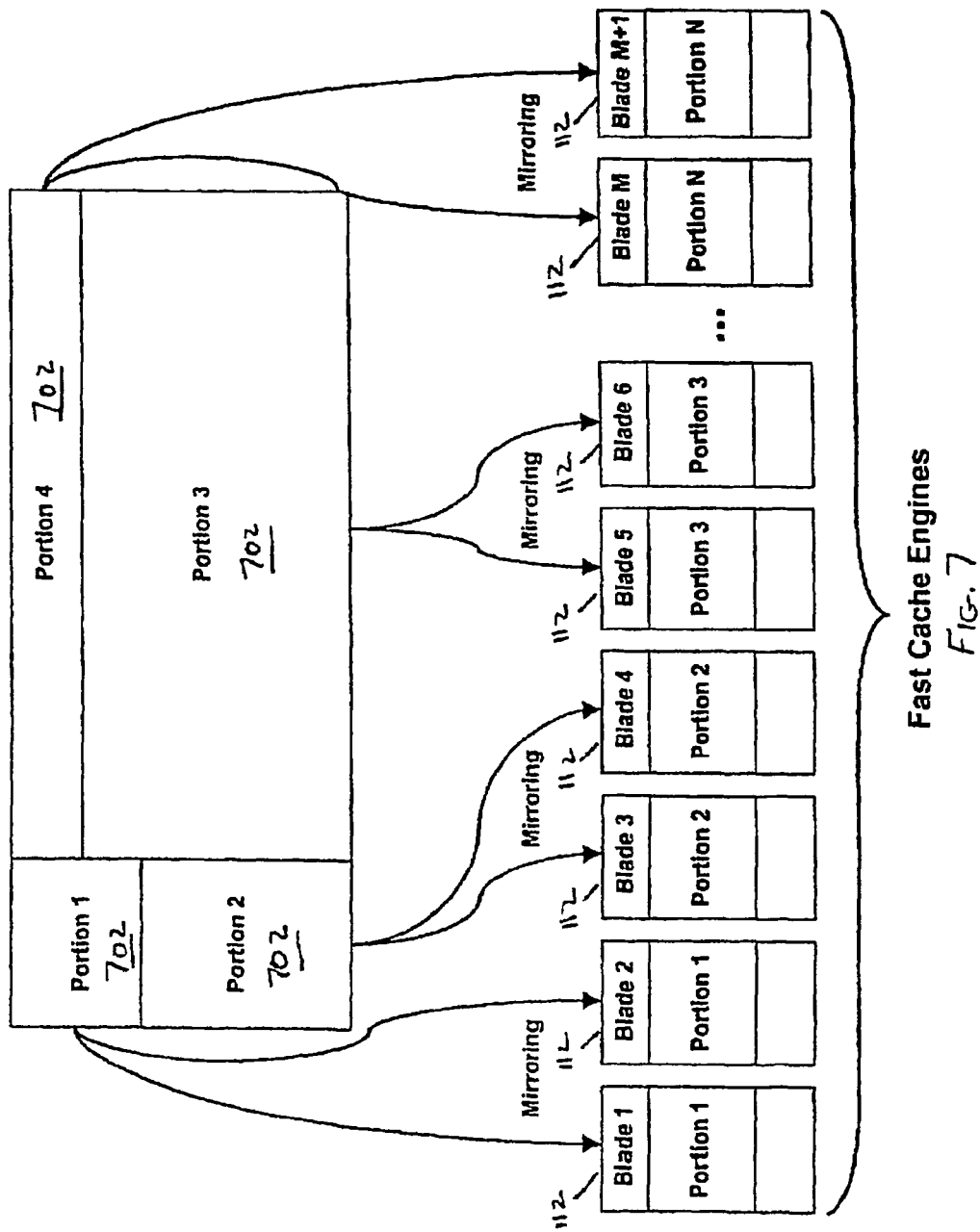
FIG. 7 is a diagram of a table from a relational database management system having sets of data attributes and data records divided into portions for distribution across multiple blades.

Referring to FIG. 7, in addition to horizontal and vertical distributions, the table 500 also may be divided into any other arbitrary portions 702, such as, for example, the four portions 702 shown. Each portion 702 may be loaded into instances of the fast query system on multiple blades 112. FIG. 7 illustrates the portions 702 being loaded into mirrored instances. FIGS. 5-7 illustrate various ways a large monolithic application may be divided and distributed across multiple blades. A system developer may choose to distribute the table 500 in any manner to increase system performance and/or improve availability.

Figure 8:
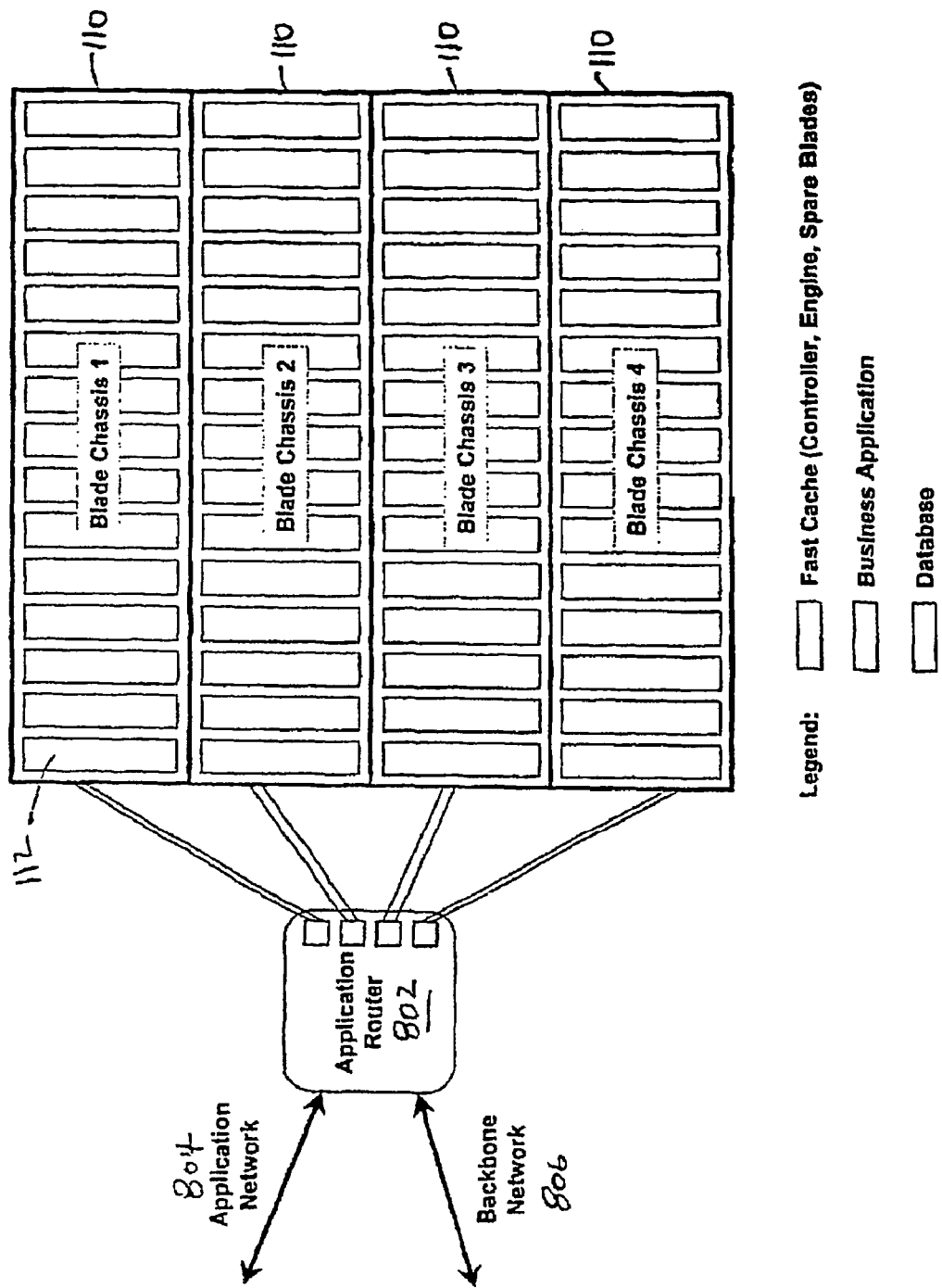
FIG. 8 is a block diagram of an application router used to distribute client requests to the appropriate blade or blades of one or more blade serves.

Referring to FIG. 8, the descriptions above discuss distributing data across multiple blades 112 in a single blade server 110. Applications also may be distributed across multiple blade servers 110 as shown in FIG. 8. To facilitate routing of requests, an application router 802 may be used. The application router 802 is coupled to one or more networks, such as, for example, an application network 804 and a backbone network 806. The application router 802 accepts requests from clients 102 across the application network 804 and from other applications across the backbone network 806. These requests are routed to the appropriate blade or blades 112 within one or more blade servers 110.

For example, a system may include a fast cache application, a database, and a customer relationship management system. So that the backend architecture may evolve, the application router 802 may be used to provide a level of indirection. If the location of the database is moved from one blade 112 to another blade 112 or from one set of blades 112 to another, then only the application router 802 needs to be updated. Clients 102 still send requests to the application router 802 which serves as a proxy for applications running on the blade servers 110.

Figure 9:
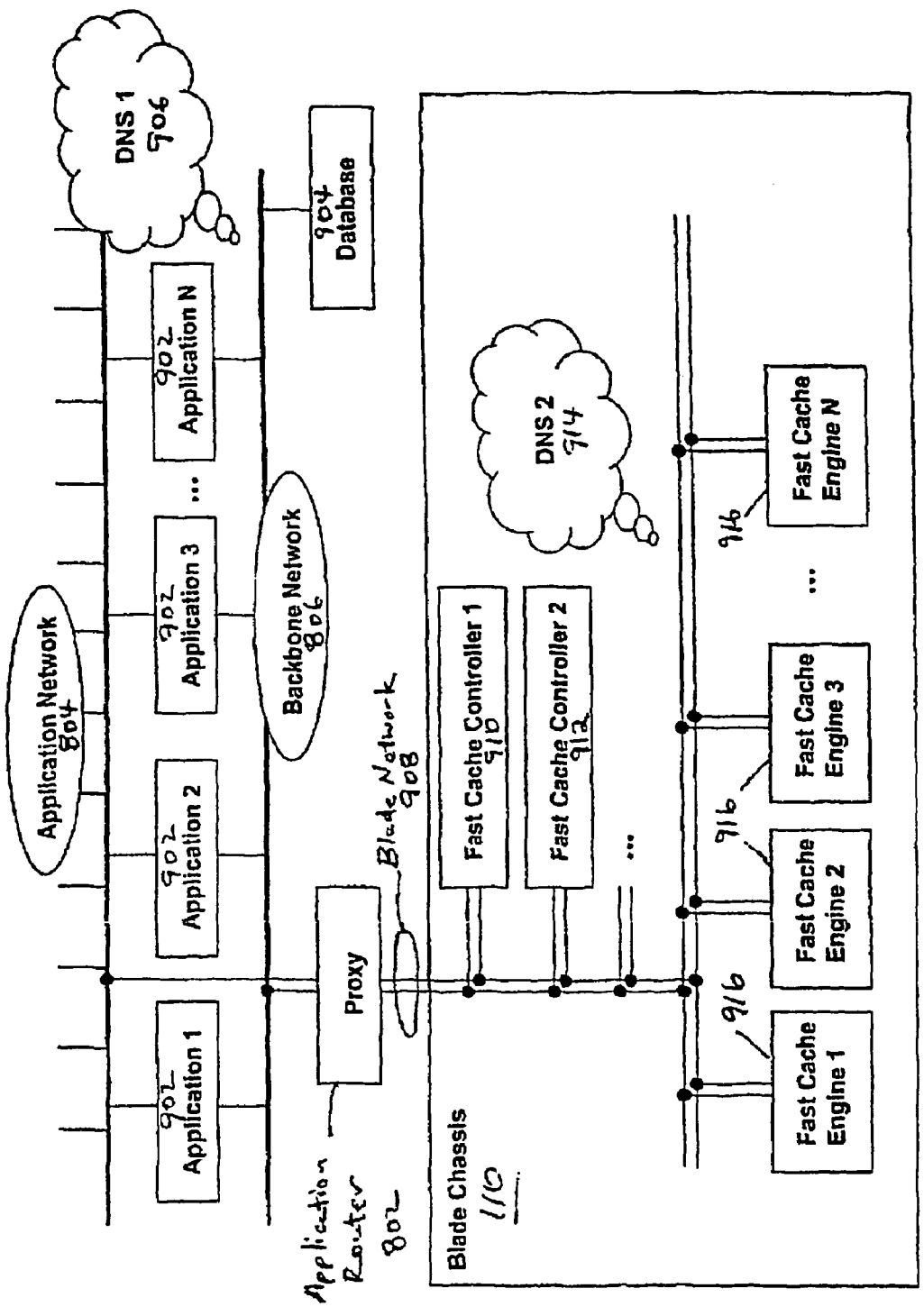
FIG. 9 is a network diagram of a fast cache query system distributed across multiple blades.

FIG. 9 shows a network diagram of one implementation of a fast cache system distributed across multiple blades 112. Clients 102 are coupled to the application network 804 through any conventional means. Using the application network 804, clients 102 may access one or more applications using the hostname of the applications 902 to submit requests. The hostnames are resolved to addresses (e.g., Internet protocol (IP) addresses) using a domain name service (DNS) 906. Applications 902 may access one another or a database 904 across a backbone network 806.

A fast cache system is distributed across blades 112 in a blade server 110. Clients 102 submit requests across the application network 804 to the application router 802 which serves a proxy for the fast cache system. The application router 102 sends requests across a blade network 908 to a fast cache controller 910 or 912 which submits a query to one or more fast cache engines 916. The fast cache engines 916 are instances of the fast cache query system running on the blades 112 of the blade server 110.

A second DNS 914 is used to resolve hostnames behind the application router 802. For example, the fast cache controller 910 may be given a host name and IP address that is stored in DNS 914, but not in DNS 906. This allows the configuration of the fast cache system to be hidden behind the application router 802.

The application router 802 is typically located outside of the blade 110 chassis and may be used to isolate the backbone network 806 from the blade network 908. By decoupling the backbone network 806 from the blade network 908, the networks may operate at different speeds and use different technologies or protocols and traffic on the backbone network 806 will not directly impact the performance of inter-blade communication in the blade network 908.

The blade network 908 serves as a fast interconnect between the blades 112 residing in the blade server 110. In this system, each blade 112 is equivalent from a hardware point of view; however, the software functionality of each blade 112 may be different. The majority of blades 112 are used as engines 916 to perform application tasks, such as, for example, selections, inserts, updates, deletions, calculations, counting results, etc. Each engine 916 owns and manages a portion of data as described above with respect to FIGS. 5-7.

The cache controllers 910 and 912 oversee the operation of the fast cache system performing tasks such as, for example, monitoring client connectivity, receiving calls from clients and/or applications and distributing the class to the appropriate engines 916, collecting results from the engines 916, combining the results from different engines 916 to determine a response to a query, and sending the response to the requesting entity.

The system architecture described in FIG. 9 is applicable to some implementations of blade servers 110. Additional commercial implementations of blade servers 110 may provide different internal architectures with varying numbers of blades 112 and network designs.

One skilled in the art will understand how to use the techniques herein described with any blade server 110 design.

The hardware architecture is described above for distributing an application across multiple blades 112 in one or more blade servers 110. A description of the logical and software design of such an architecture follows.

Figure 10:
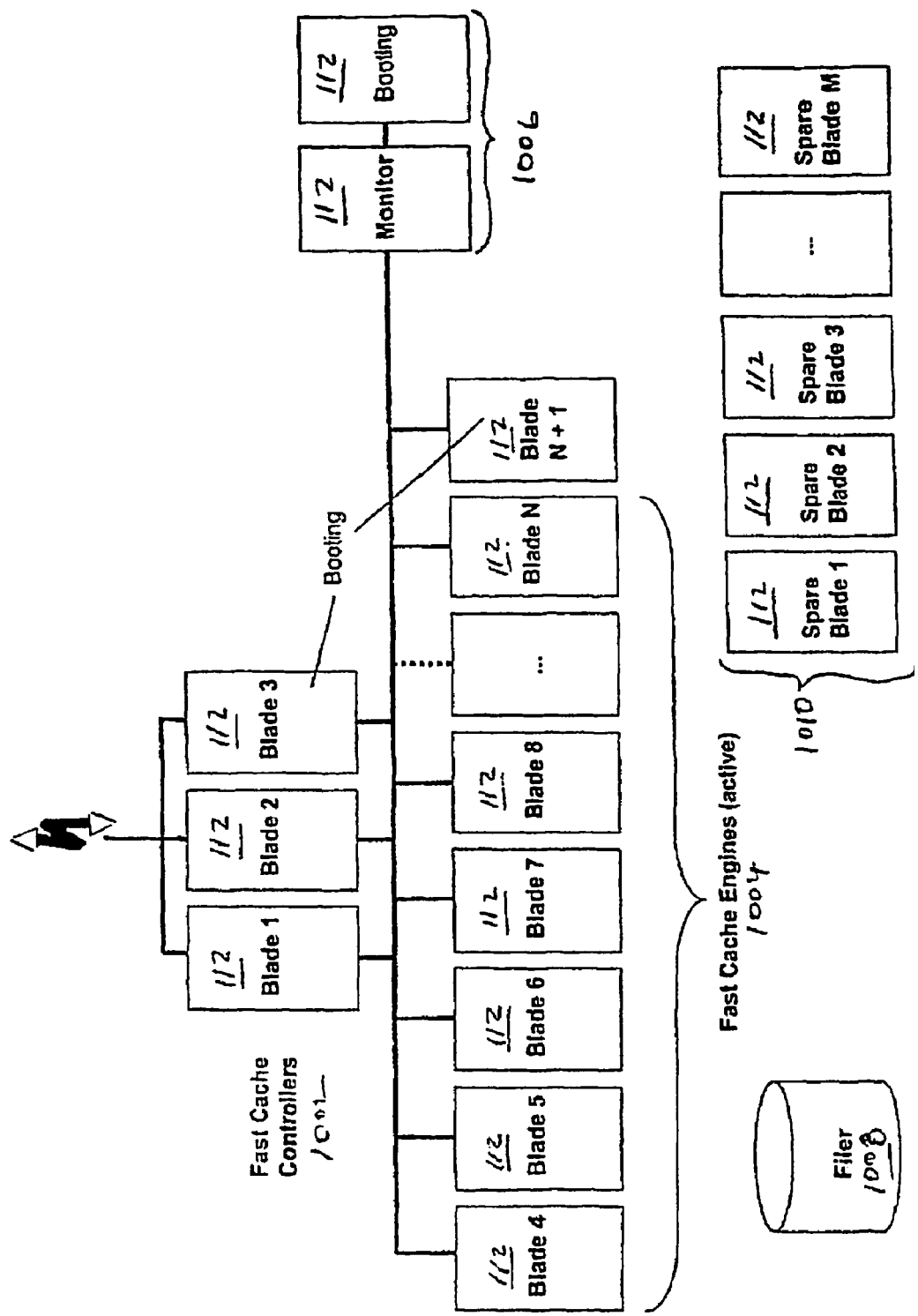
FIG. 10 is a block diagram of the logical relationships between blades in an application distributed across multiple blades.

Referring to FIG. 10, a fast cache system is deployed on one or more blade servers 110 having a total of N blades 112. When a new blade 112 is added to the system, the operating system and software may be installed on the blade 112 such that the blade 112 may be used in the distributed fast cache implementation. The software images may be stored in the filer data store 1008. Once the software image is installed on a blade 112, the system may start services, run scripts, install and configure software, copy data, or perform any other tasks needed to initialise or clone the blade 112.

The blades 112 serve at least two major functions: as a controller 1002 or as an engine 1004. The controllers 1002 receive requests from clients and coordinate the requested action with the engines 1004. In addition, a monitor 1006 may be executed on a blade 112 to assist the controller 1002 in detecting performance problems, component failures, software failures, or other event. The monitor 1006 functionality instead may be included in the controllers 1002 or engines 1004 or distributed between the controller 1002, engine 1004, and/or monitor 1006.

To reduce the likelihood of system outage due to the failure of the controller 1002, redundant controllers 1002 may be provided. In the implementation shown in FIG. 10, two controllers 1002 are provided, with a third in a "booting" state (described further below). In some implementations, a serves as a primary controller 1002, coordinating all requests and controlling all engines 1006. In other implementations, multiple controllers 1002 are simultaneously used with each controller 1002 corresponding to a portion of the engines 1004.

For each of the blade 112 categories (i.e., controllers 1002, engines 1004, and optionally monitors 1006), the system attempts to maintain an extra blade 112 in the booting state so that it may be quickly used if a failure is detected. FIG. 10 shows a controller 1002 in the booting state, an engine 1004 in the booting state, and a monitor 1006 in the booting state 1006. In addition, a number of spare blades 1010 may be maintained to be used as needed.

In this implementation, a blade 112 may be configured in cold reserve, warm reserve, or hot reserve. In cold reserve state, the blades 112 is loaded with an operating system and software and then either placed in a low power state, turned off, or otherwise temporarily deactivated.

In the warm reserve state, the blade 112 is powered on and the operating system is booted and ready for use; however, the application software is not started. A blade 112 in the warm state may be activated by setting the appropriate configuration, providing any necessary data, and starting the application software.

In the hot reserve state, the blade 112 is up and running as in the warm reserve state; however, a hot reserve blade 112 also runs the application software. Though a hot reserve blade 112 has application software running, the blade 112 is still in reserve and does not actively participate in the productive operation of the system. In many cases, a blade 112 may be in hot reserve for only a short time as a blade 112 transitions from a cold or warm state to an active state.

In the system shown in FIG. 10, spare blades 1010 may be kept in warm reserve until they are needed and booting blades may be kept in a hot reserve state so that they may be quickly placed in active service.

Figure 11:
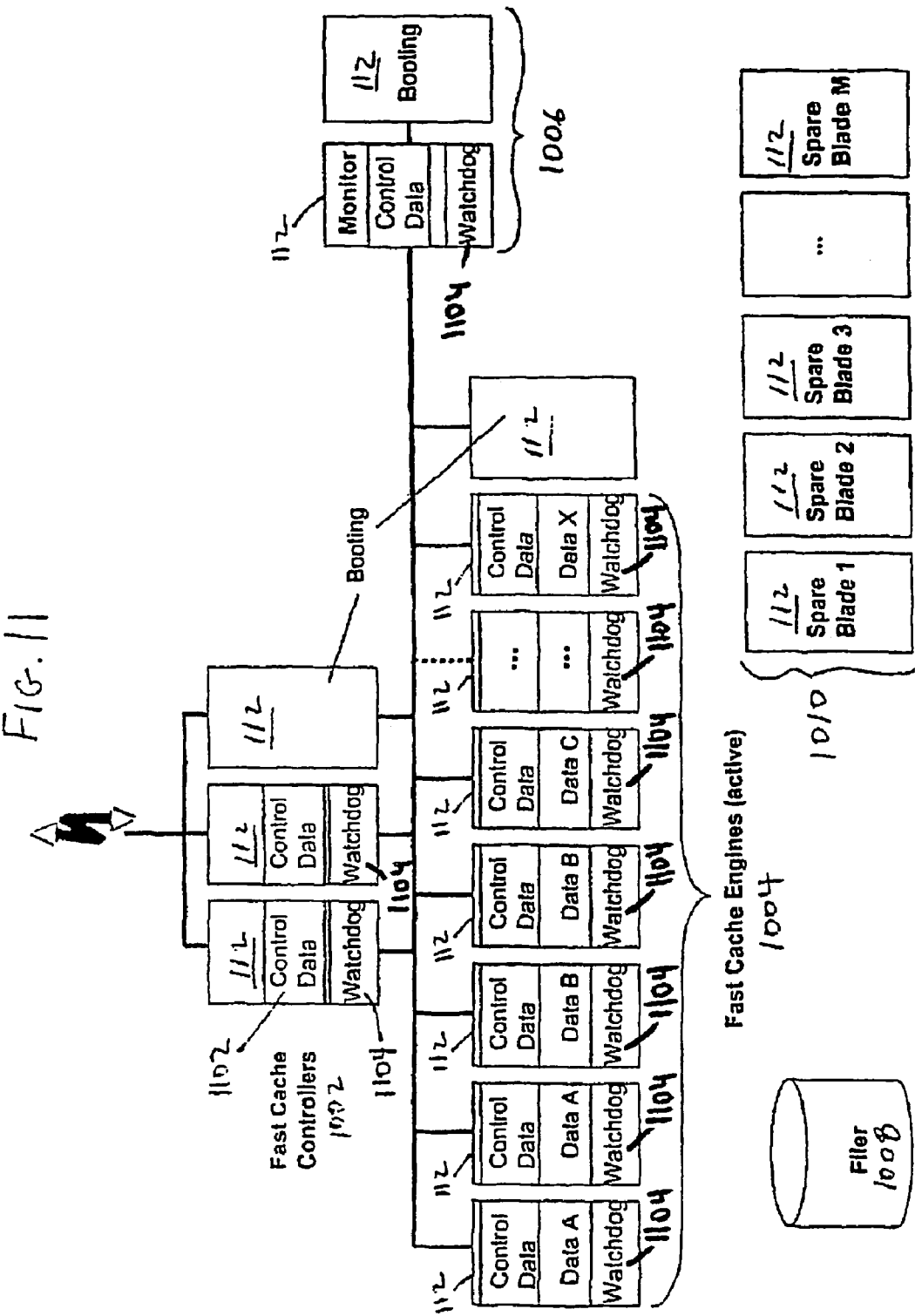
FIG. 11 is a block diagram of an application distributed across multiple blades using a watchdog process to detect errors, bottlenecks, or other faults.

Referring to FIG. 11, the fast cache system may be distributed across multiple blades 112 as described herein. The system may provide redundancy in the controllers 1002 by maintaining at least two active controllers 1002 at all times. This allows the system to remain active and functioning even if a single controller 1002 fails. In addition, the system may provide redundancy in the engines 1004 by mirroring data. Instead of keeping a single copy of data portions from horizontal, vertical, or arbitrary distributions (described above with respect to FIGS. 5-7), the system may mirror the data, storing the identical data on multiple blades 112. This may facilitate redundancy, load balancing, and/or availability. When mirrored engines 1004 are used, there is no need to run queries on both mirrored copies, duplicating effort; however, when data updates occur each mirror must be updated appropriately so that the mirrors maintain the same data.

Sometimes, a progression of internal state changes may lead software to fail due to some software bug. If two mirrored copies maintained exactly the same state, then a software bug causing failure would likewise cause failure in each mirror. To prevent this, it is useful that mirrored engines 1004 not maintain exactly the same state, only the same data.

In the fast cache implementation, engines 1004 maintain various internal counters, variables, parameters, result sets, memory layouts, etc. To avoid identical occurrences of internal variables, a series of read requests may be distributed between equivalent engines 1004 through any load balancing techniques. For example, a round-robin technique may be employed to alternate requests through each available engine 1004 or requests may be sent to the first idle engine 1004.

As shown in FIG. 11, the cache controllers 1002 are responsible for distributing requests to the appropriate engines 1004. Thus, the controllers 1002 need to know 15 information, such as, for example, what engines 1004 are available and what data is loaded into each engine 1004. The cache controllers 1002 maintain control data 1102 that includes information needed to perform the tasks of the controller 1002. This control data 1102 may be distributed to each blade 112 as shown in FIG. 11. That way if each controller 1002 failed, a new controller can be started on any active blade 112 or a new blade 112 may obtain the needed control data 1102 from any other blade 112.

When the monitor 1006 determines that an engine 1004 is not operable or a bottleneck situation is occurring, the monitor 1006 informs the controllers 1002 of any changes in the blade landscape. The controllers 1002 then update the new control data 1102 in each of the engines 1004.

As shown in FIG. 11, each blade 112 also may include a watchdog process 1104 to actively monitor and detect software and/or hardware failures in any of the active blades 112. The watchdog processes 1104 supervise each other and report on the status of the fast cache system to the monitor 1006.

Figure 12:
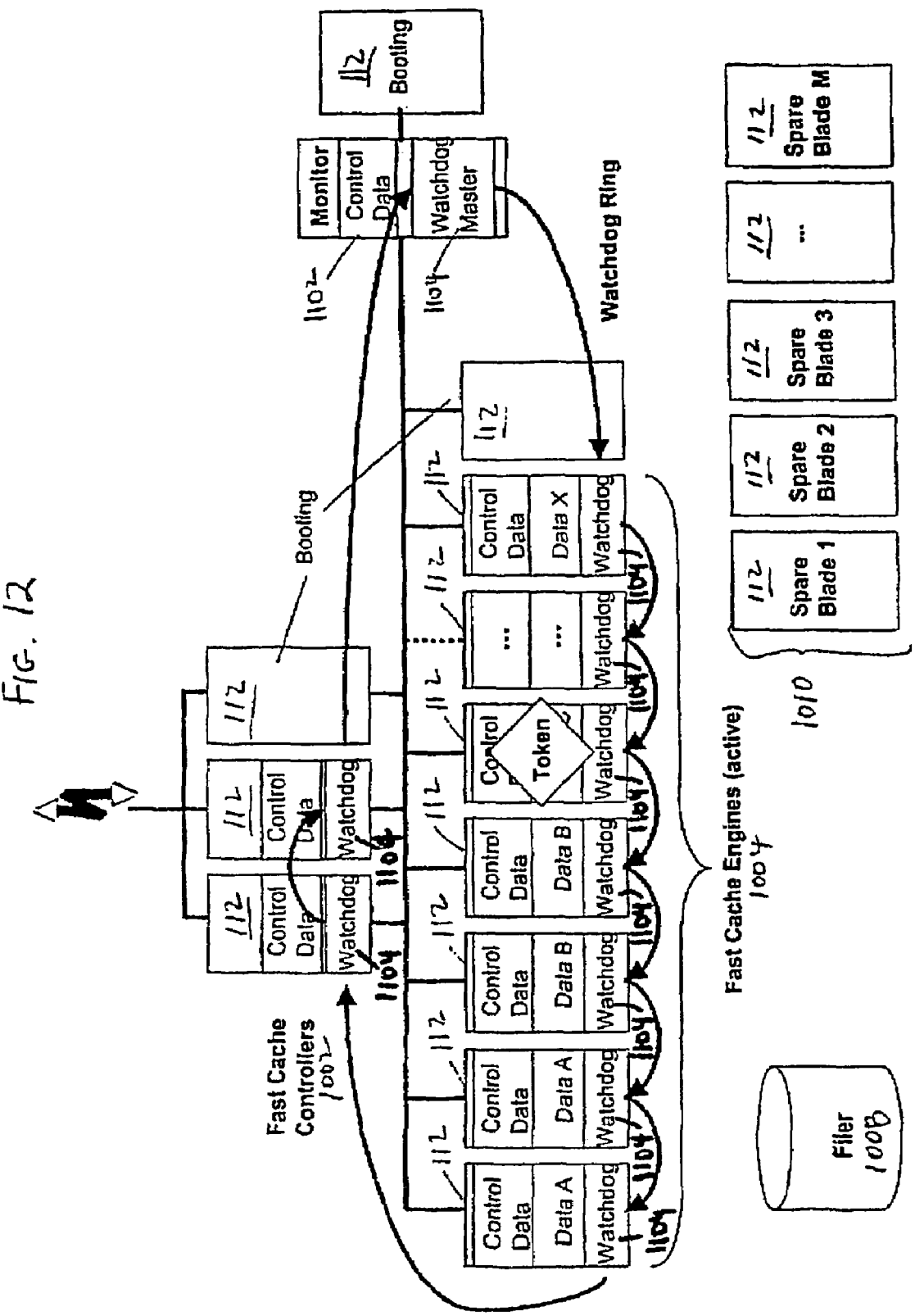
FIG. 12 is a block diagram of a token ring process for monitoring system functionality using watchdog processes.

Referring to FIG. 12, the watchdog processes 1104 actively report on their status so 30 that failures may be detected. For example, if a blade 112 operating system freezes, the system may appear to be operational from a hardware perspective; however, the system may be unable to satisfy requests. If a watchdog process 1104 fails to report on status in a timely fashion, then the monitor 1006 may assume that the blade 112 is down and update the blade landscape accordingly. To prevent all watchdog processes 1104 from simultaneously sending update information, a token ring technique may be used.

In this implementation, the watchdog processes 1104 are configured in a logical ring structure. The ring reflects the order in which the watchdog processes 1104 are allowed to submit status information. In this manner, only one watchdog processes 1104 may submit status information at a given time. The ring may be traversed in a clockwise or counterclockwise manner. One watchdog process 1104 serves as a master watchdog process 1104 to receive status information. By default, the monitor 1006 watchdog process 1104 is chosen as the master, however, any other watchdog process 1104 could also serve this purpose. The ring is traversed by passing a token from one watchdog process 1104 to the next. When a watchdog process 1104 receives the token, the watchdog process 1104 submits status information to the master watchdog process 1104. The master then sends an acknowledgment to the submitting watchdog process 1104. When the watchdog process 1104 receives the acknowledgment, the token is passed to the next watchdog process 1104 in the ring. In this implementation, status exchange is symmetrical; the master sends its status information to each other watchdog process 1104 and likewise receives status information from each watchdog process 1104. Timeouts are used to detect hung, slow, or otherwise failed processes.

The watchdog process 1104 having the token may detect problems with the master watchdog process 1104 if an acknowledgement of the status information is not received. When the master watchdog process 1104 dies, the watchdog process 1104 with the token may detect the problem and initiate a procedure to replace the master watchdog process 1104. For example, the watchdog process may (e.g., the watchdog process 1104 running on another monitor 1006) be promoted to the master watchdog process 1104. When a new master watchdog process 1104 is operational, the token is passed and the status reporting continues.

In some implementations, the master watchdog process 1104 serves in place of the token. The master watchdog process 1104 calls one watchdog process 1104 after another in a predefined order. Upon being called, each watchdog process 1104 submits status information to the master. After successful receipt of status information, the master watchdog process 1104 continues to the next watchdog process 1104. This process may be repeated periodically to identify hung, slow, or otherwise failed blades 112.

In any software application, there is a possibility of bugs in application software or in the operating system that can degrade system performance over time, possibly resulting in system outage. For example a software application may include some bug that makes the process unstable as it ages, such as a memory leak where some memory is not released after it is no longer needed. With such a design error, there may be no logical errors that would cause improper behaviour in the application; however, over time the system will exhaust all available resources as memory is slowly drained. Additionally, failures and instabilities may occur due to counter overflows. It is desirable to periodically restart processes to protect against bugs such as memory leaks.

Additionally, some processes reread some configuration information or rebuild internal data structures when restarted. To update the process, a periodic restart may be required. When a process restarts, the process is brought down temporarily and restarted, thus causing some temporary service outage. It is desirable to provide a mechanism to restart processes while minimizing or preventing any downtime.

Figure 13:
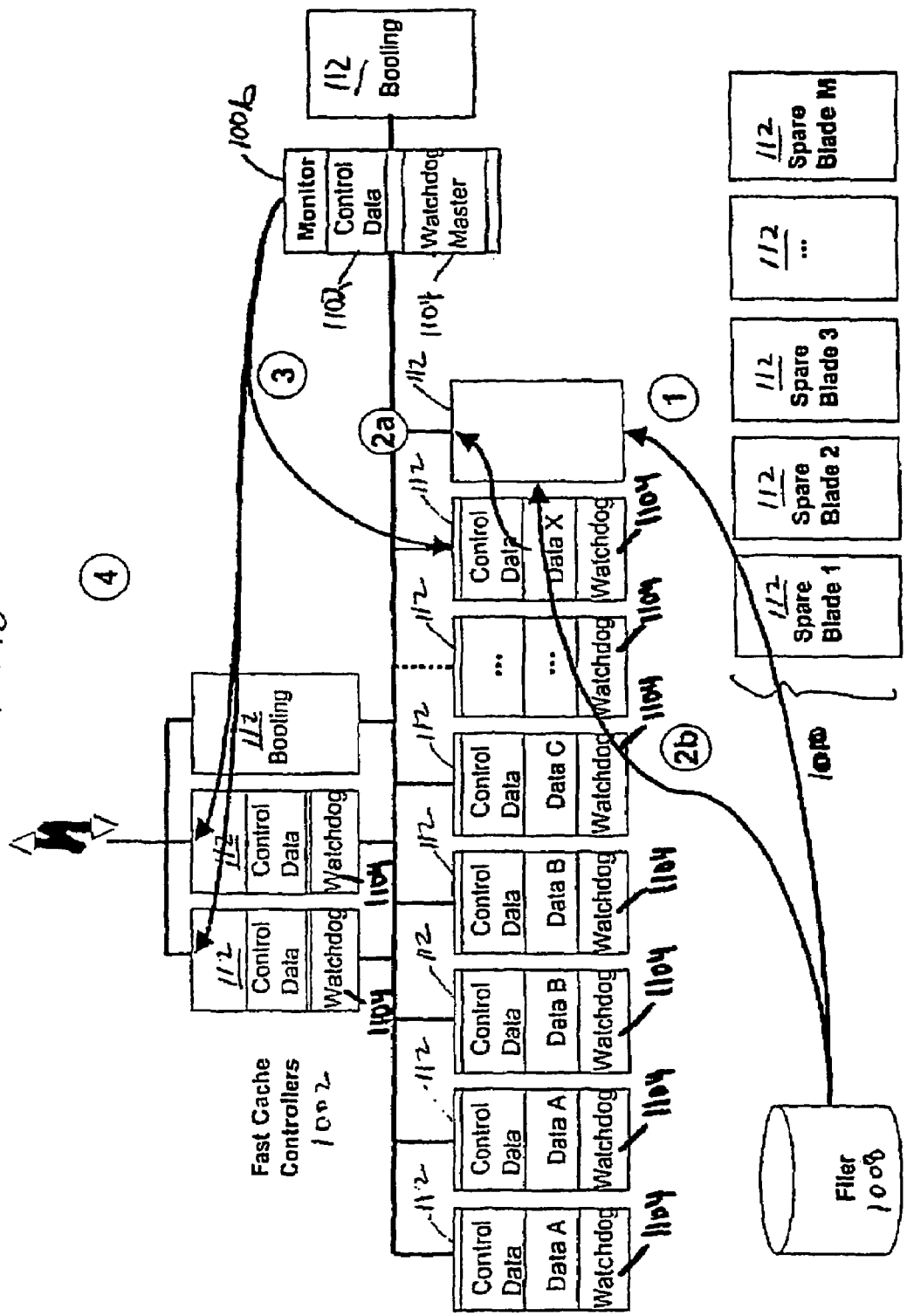
FIG. 13 is a block diagram of a system activating an application blade from a pool of spare blades.
Figure 14:
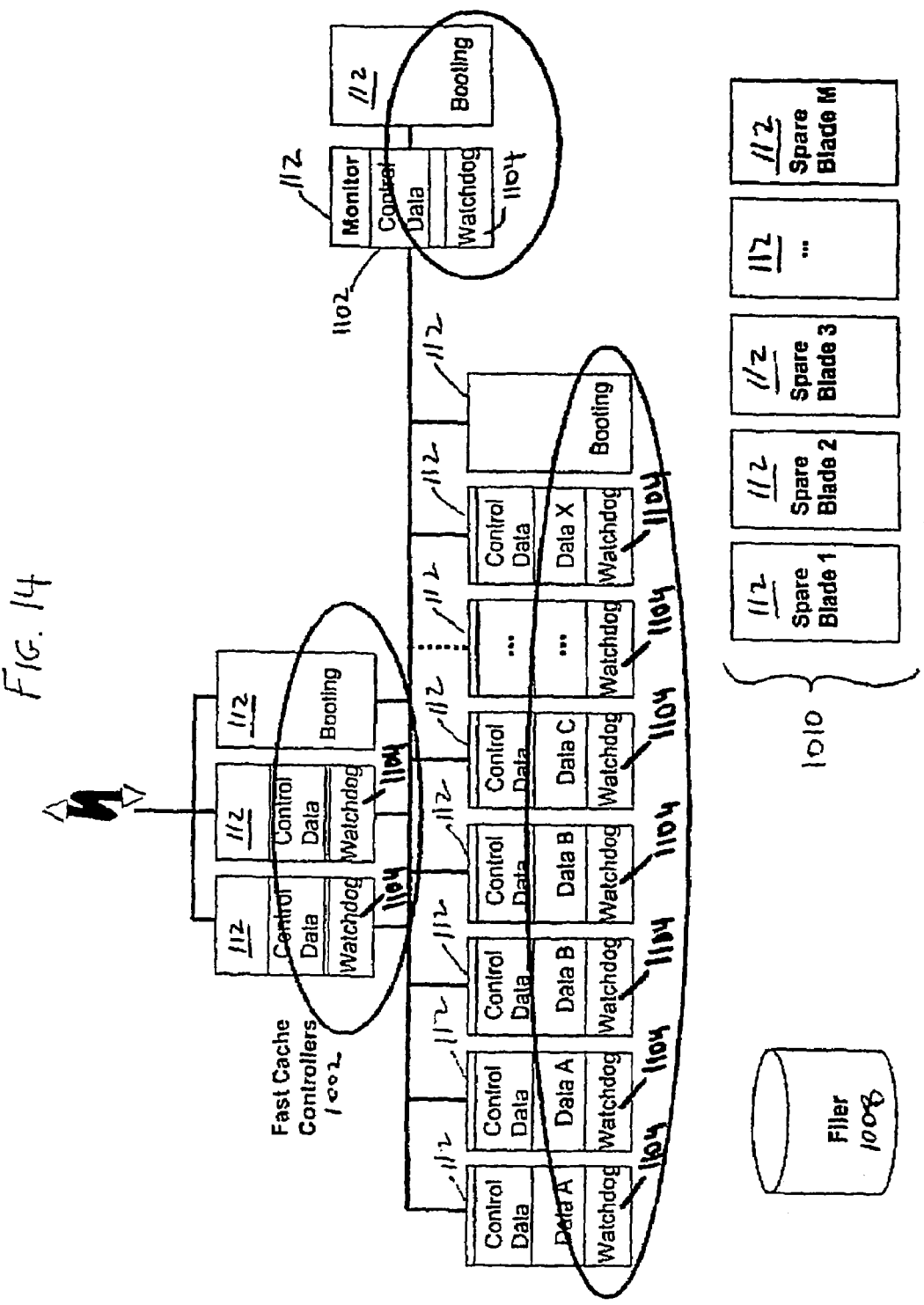
FIG. 14 is a block diagram of a system that copies information to activate a new application blade.

Referring to FIG. 13, an engine 1004 may be restarted on a new blade 112 by starting up the appropriate software on the new blade 112, copying the process context information from the running engine 1004 onto the new blade 112 to take over for the existing engine 1004. For example, a booting blade 112 may be used that already has been imaged with the necessary software copies from the filer 1008. If a hot reserve blade 112 is unavailable, a warm or cold reserve blade may be prepared by copying the needed software from the filer 1008 and starting any needed processes. Next, the new blade 112 needs the appropriate process context information to operate the place of the old blade 112. The process context includes various data and state information needed for the new engine 1004 to take the place for the old engine 1004. For example, the new blade 112 needs the data portion of the table 500 stored in the old engine 112 as well as the control data 1102 from the old engine 1004.

In this implementation, there are two types of data that make up the process context information of an engine 1004: non-client data and client data. Non-client data includes process context information obtained from other sources, such as, for example, control data 1102. The non-client data is not changed directly by the client and may be directly copied to the new blade 112. Client data is data the may be modified by the old engine 1004. This data must be fully copied before any changes occur. Any conventional transactional database techniques may be used to facilitate data copying. For example, a checkpoint of the data structures used by the old engine 1004 may be made to the filer 1006. The checkpointed data may then be immediately loaded into the new blade 112.

When the appropriate process context information has been loaded, the monitor 1006 informs the controllers 1002 that the new engine 1004 is available and terminates the old processes. The old blade 112 may then be initialised as a booting blade 112. The example shown above applies to engine 1004 processes; however, the same technique may be used to restart any other process including controllers 1002 or monitors 1006. This technique allows a process to be restarted before the old process is terminated, thus preventing any downtime.

Because regularly restarting processes may increase system stability, some implementations periodically restart each controller 1002, each engine 1004, and monitors 1006.

Figure 15:
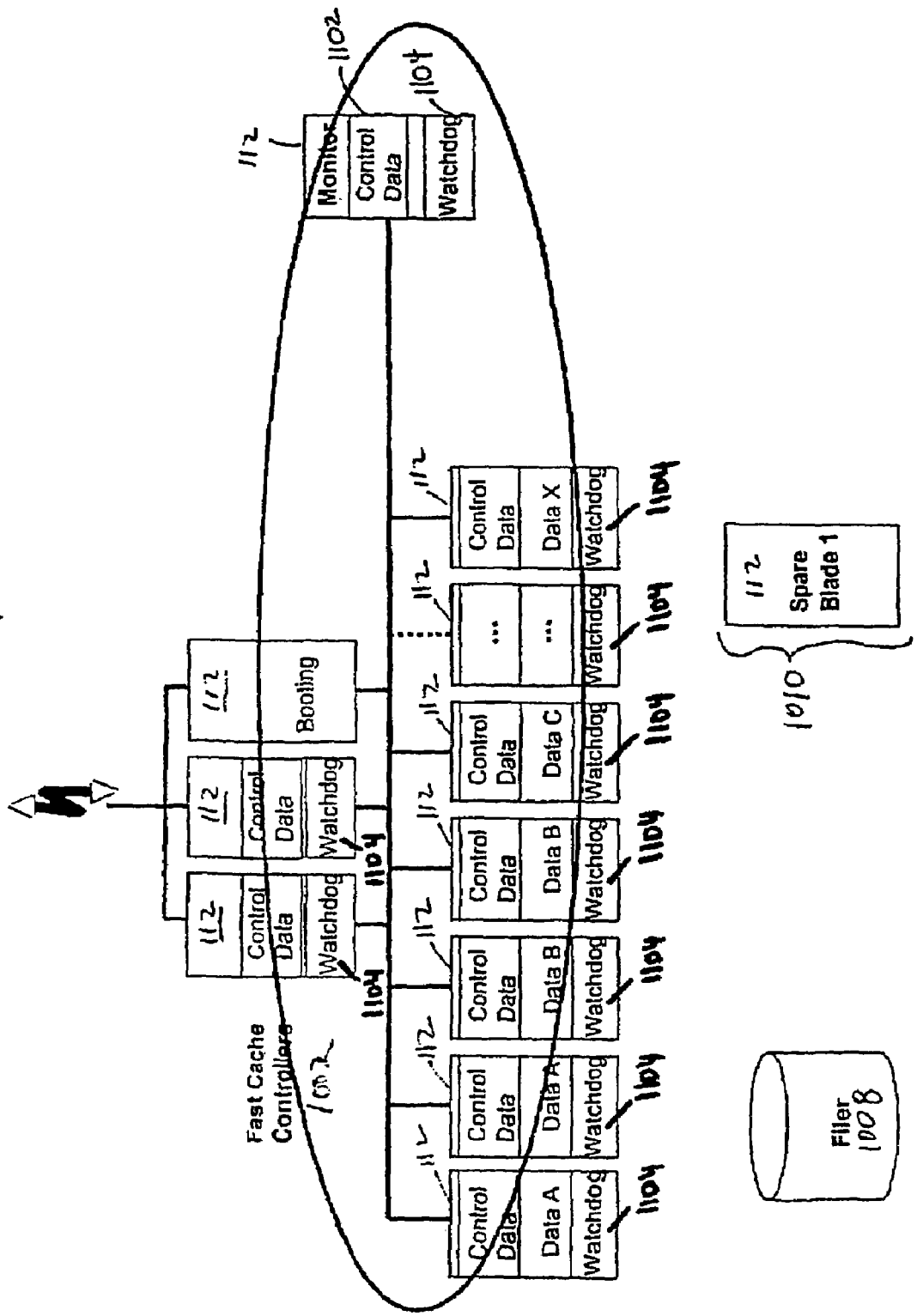
FIG. 15 is a diagram of a system using a single booting blade to periodically restart multiple blade classes.

Referring to FIG. 15, if fewer than three spare blades 1010 are available, then a single booting blade 112 may be shared by the controllers 1002, engines 1004, and monitors 1006. The booting blade 112 also serves as a spare in case of an outage or other event necessitating replacement.

Figure 16:
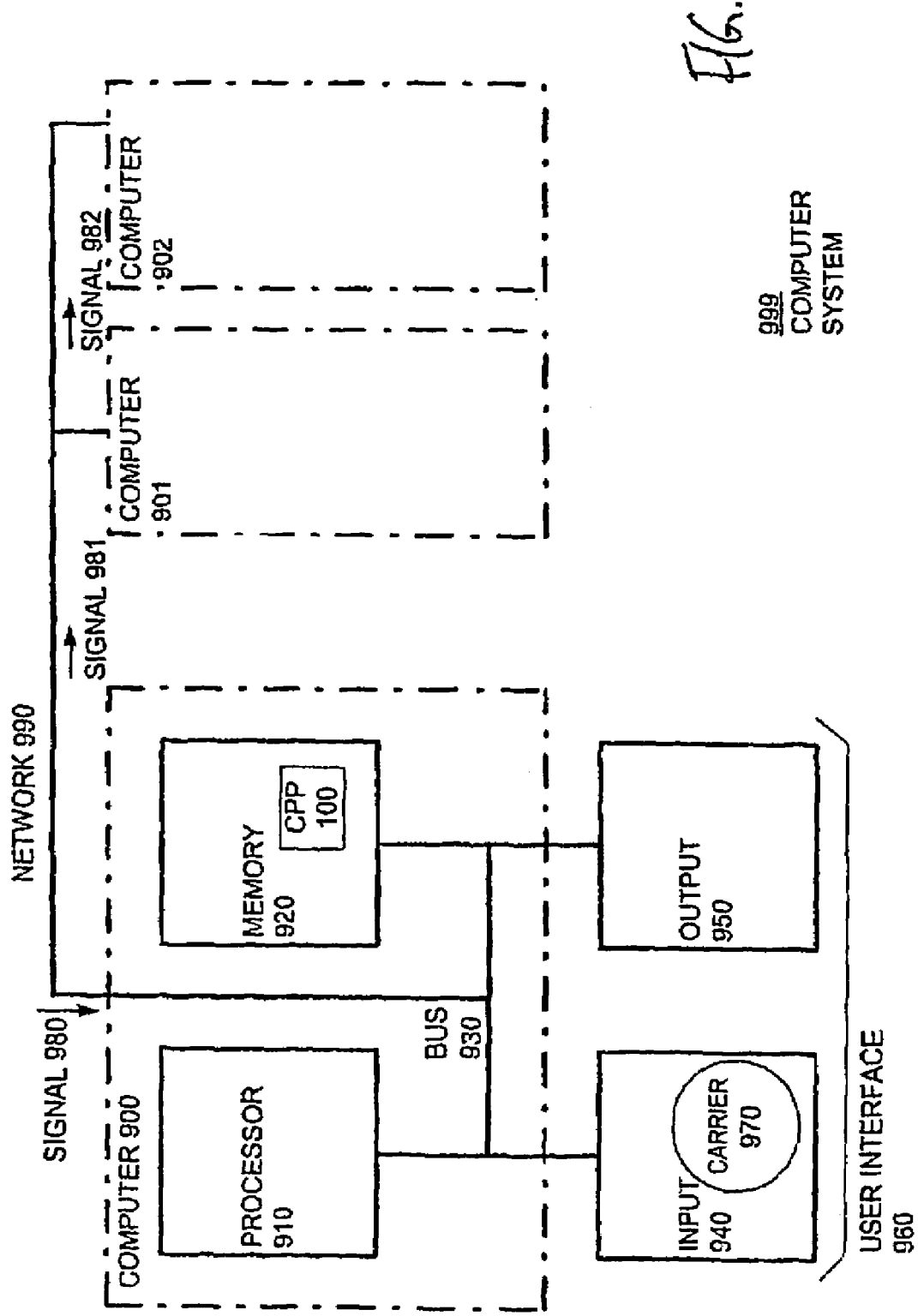
FIG. 16 illustrates a simplified block diagram of a computer system in that the present invention may be operated.

FIG. 16 illustrates a simplified block diagram of exemplary computer system 999 having a plurality of computers 900, 901, 902 (or even more). Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

In respect to computer 900, computer 901/902 is sometimes referred to as "remote computer", computer 901/902 is, for example, a server, a peer device or other common network node, and typically has many or all of the elements described relative to computer 900.

Computer 900 is, for example, a conventional personal computer (PC), a desktop device or a band-held device, a multiprocessor computer, a pen computer, a micro-processor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 is elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk-DVD); (c) semi-conductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that is operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optional.

Bus 930 and network 990 provide logical and physical connections by conveying instruction and data signals. While connections inside computer 900 are conveniently referred to as "bus 930", connections between computers 900-902 are refereed to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Usage of the invention is possible in a wide area, by example performing the method in connection of services that belong to a business application selected from the group of Customer Relationship Management (CRM), Business Intelligence, Supply Chain Management (SCM), Supplier Relationship Management, Enterprise Portal, Enterprise Resource Planning, Marketplace, Product Lifecycle Management (PLM), Human Resources, Financials, and Mobile Business.

While the invention has been described in terms of particular methods, programs and systems, those of skill in the art will understand based on the description herein that it is not limited merely to such particulars and that the full scope of the invention is properly determined by the claims that follow. While the explanation conveniently uses assumptions, such as by referring to a "fast cache system", persons of skill in the art can apply the invention to other applications as well.

The invention claimed is:

1. A computer-implemented method for managing a computer system, the computer system operating with a plurality of blades, the method comprising steps performed by a computer of:
   detecting the presence of a new blade in the computer system, wherein the plurality of blades includes first and second groups, and the new blade belongs to the first group;
   monitoring system performance;
   upon reaching a predefined threshold of a measurement value, automatically installing a first service on the new blade and a second service to a second blade in the second group of blades, wherein the first and second services differ, wherein the measurement values are taken from at least the following: usage of processor resources, processing times, usage of memory, remaining capacity of data storage, and communication parameters of a blade interface;
   automatically configuring the first service based on a configuration used in an earlier detected blade;
   copying a service that is running on the earlier detected blade to the new blade, wherein the service is copied from a memory of the earlier detected blade to the new blade;
   testing the service in parallel operation on the earlier detected blade and the new blade;
   cyclically repeating, in a first cycle, copying, installing, and parallel testing for the plurality of blades, wherein a first specialized configuration is used for the service of the first group;
   cyclically repeating, in a second cycle, copying, installing, and parallel testing for the plurality of blades in the second group while keeping the number of blades in the second group that are installing the service smaller than the number of blades in the second group that are not installing the service, wherein a second specialized configuration is used for the service of the second group; and
   cyclically repeating, in a super cycle across the first and second groups, copying, installing, and parallel testing of a third service across the first and second groups, where the number of blades installing the third service is kept less than the number of blades not installing the third service,
   wherein the copying of the second service is monitored by a group of blades other than the second group, and the shifting of the first service is monitored by a group of blades other than the first group.

2. The method of claim 1, wherein installing the operating system is performed by accessing a mass storage that is part of the computer system.

3. The method of claim 1, wherein installing is performed by using scripts.

4. The method of claim 3, wherein installing is performed by using scripts that are part of the service that is running on the computer system prior to detecting the new blade.

5. The method of claim 1, wherein monitoring is performed periodically.

6. The method of claim 1, wherein monitoring is performed by monitoring processes that operate consecutively for adjacent blades.

7. The method of claim 6, wherein monitoring is performed by a token ring technique.

8. The method of claim 1, wherein the measurement values are related to the blades independently.

9. The method of claim 1, wherein the processing times are related to processing times for incoming telephone calls and a call rate.

10. The method of claim 1, wherein computer instructions to perform the detecting step are part of services that are running on the computer system.

11. The method of claim 1, wherein computer instructions for the detecting and copying steps are performed according to criteria in the service that is running on the earlier detected blade.

12. The method of claim 1, wherein copying the service comprises restarting the service, wherein executable instructions of the service are loaded from a central storage and wherein an image of the process context of the service is transferred to the new blade.

13. The method of claim 1, wherein copying the service comprises modifying the version of the service.

14. The method of claim 1, wherein installing the operating system comprises modifying the system.

15. The method of claim 1, wherein the method is performed for at least 3 blades, the method further comprising the subsequent execution of a controller service, an engine service, and a monitor service, the services belonging to a same business application.

16. The method of claim 1, controlled by a controller residing on at least one blade, wherein the controller further performs at least one function selected from the group of: testing the copy of the service on the new blade, and modifying the execution of the service on the earlier detected blade if the copy of the service operates successfully.

17. The method of claim 16, wherein modifying comprises stopping the service on the earlier detected blade.

18. A processor-implemented method for managing a computer system, the system operating with a plurality of computers in at least two groups, the method comprising steps performed by a processor of:
   assigning, via the processor, a first service to the first group of computers and a second service to the second group of computers, wherein the first and second services differ;
   monitoring system performance;
   upon reaching a predefined threshold of a measurement value, shifting, via the processor, the first service that runs on a first computer of the first group to run on a second computer in the first group, wherein the shifting includes copying the first service from a memory of the first computer to the second computer, wherein the first and second services differ, and wherein the measurement values are taken from at least: usage of processor resources, processing times, usage of memory, remaining capacity of data storage, and communication parameters of a blade interface;

testing, via the processor, the service in parallel operation on the first computer and on the second computer, and disabling the operation of the service by the first computer only if the test is successful;

installing the service to the first computer;

cyclically repeating, in a first cycle, the shifting, re-installing, and parallel testing for the plurality of computers in the first group while keeping the number of computers in the first group that are re-installing the first service smaller than the number of computers that are not installing the first service, wherein a first specialized configuration is used for the first service of the first group;

cyclically repeating, in a second cycle, shifting, installing, and parallel testing for the plurality of computers in the second group while keeping the number of computers in the second group that are installing the second service smaller than the number of blades in the second group that are not installing the second service, wherein a second specialized configuration is used for the service of the second group; and cyclically repeating, in a super cycle across the first and second groups, a shifting, installing, and parallel testing of a third service across the first and second groups, where the number of computers installing the third service is kept less than the number of blades not installing the third service, wherein the shifting of the second service is monitored by a group of computers other than the second group, and the shifting of the first service is monitored by a group of computers other than the first group.

19. The method of claim 18, wherein shifting and re-installing is repeated cyclically for all computers in the groups, thereby keeping the number of computers that are re-installing the operating system smaller than the number of computers that are not re-installing the operating system.

20. The method of claim 18, wherein the assigning step is performed for services of a first class on a first group of computers and for services of a second class on a second group of computers.

21. The method of claim 18, wherein the computers are blades.

22. A tangible computer-readable storage medium comprising instructions for execution by a processor for the practice of a method for managing a computer system, the instructions, when executed by the processor, causing the processor to:

detect the presence of a new blade in the computer system, wherein the computer system includes a plurality of blades in at least first and second groups;

automatically install an operating system on the new blade;

automatically configure the operating system based on a configuration used in an earlier detected blade;

monitor system performance;

upon reaching a predefined threshold of a measurement value, copy a first service that is running on the earlier detected blade from the earlier detected blade to the new blade, wherein the first service applies to blades in the first group and a second service applies to blades in a second group, wherein the first and second services differ, and wherein the measurement values are taken from at least: usage of processor resources, processing times, usage of memory, remaining capacity of data storage, and communication parameters of a blade interface; and test the service in parallel operation on the earlier detected blade and the new blade;

cyclically repeating, in a first cycle, the copying, installing, and parallel testing for the plurality of blades in the first group, while keeping the number of blades in the first group that are re-installing the service smaller than the number of blades that are not re-installing the service, wherein a first specialized configuration is used for the service of the first group;

cyclically repeating, in a second cycle, copying, installing, and parallel testing for the plurality of blades in the second group while keeping the number of blades in the second group that are installing the service smaller than the number of blades in the second group that are not installing the service, wherein a second specialized configuration is used for the service of the second group; and cyclically repeating, in a super cycle across the first and second groups, copying, installing, and parallel testing of a third service across the first and second groups, where the number of blades installing the third service is kept less than the number of blades not installing the third service, wherein the copying of the second service is monitored by a group of blades other than the second group, and the copying of the first service is monitored by a group of blades other than the first group.

23. A tangible computer-readable storage medium containing instructions for execution by a processor for the practice of a method for managing a computer system, the instructions, when executed by the processor, causing the processor to:

assign a first service to a first group of computers and a second service to a second group of computers, wherein the first and second groups differ;

monitor system performance;

upon reaching a predefined threshold of a measurement value, shift a service that runs on a first computer of the group to run on a second computer in the group, wherein the shifting includes copying the first service from a memory of the first computer to the second computer, and wherein the measurement values are taken from at least: usage of processor resources, processing times, usage of memory, remaining capacity of data storage, and communication parameters of a blade interface;

re-install a first service to the first computer;

cyclically repeat, in a first cycle, the shifting, installing, and parallel testing for the plurality of computers in the first group while keeping the number of computers in the first group that are re-installing the first service smaller than the number of computers that are not re-installing the first service, wherein a first specialized configuration is used for the first service of the first group;

cyclically repeat, in a second cycle, shifting, installing, and parallel testing for the plurality of computers in the second group while keeping the number of computers in the second group that are re-installing the second service smaller than the number of computers in the second group that are not re-installing the second service, wherein a second specialized configuration is used for the service of the second group; and cyclically repeat, in a super cycle across the first and second groups, a shifting, installing, and parallel testing of a third service across the first and second groups, where the number of computers installing the third service is kept less than the number of computers not installing the third service, wherein the shifting of the second service is monitored by a group of computers other than the second group, and the shifting of the first service is monitored by a group of computers other than the first group.

* * * * *

UNITED STATES PATENT AND TRADEMARK OFFICE
CERTIFICATE OF CORRECTION

PATENT NO. : 7,610,582 B2  Page 1 of 1
APPLICATION NO. : 10/553607
DATED : October 27, 2009
INVENTOR(S) : Becker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 291 days.

Signed and Sealed this

Twelfth Day of October, 2010

David J. Kappos
*Director of the United States Patent and Trademark Office*